United States Patent [19]

Wu

[11] 3,852,723

[45] Dec. 3, 1974

[54] PROGRAMMABLE SIGNAL DISTRIBUTION SYSTEM

[75] Inventor: Wei-Wha Wu, Poughkeepsie, N.Y.

[73] Assignee: International Business Machines Corporation, Armonk, N.Y.

[22] Filed: Nov. 23, 1973

[21] Appl. No.: 418,696

[52] U.S. Cl. .......................... 340/173 R, 340/166 R

[51] Int. Cl. .............................................. G11c 11/40

[58] Field of Search........ 340/166 R, 173 R, 173 SP

[56] References Cited

UNITED STATES PATENTS 3,164,810 1/1965 Harding.......................... 340/174 M

*Primary Examiner*—Terrell W. Fears

*Attorney, Agent, or Firm*—Harold H. Sweeney, Jr.

[57] ABSTRACT

A programmable signal distribution system is provided having a plurality of signal inputs at different times, any one or more of which may be connected to any one or more of a plurality of outputs. An array of switches are connected between the plurality of inputs and the outputs. A memory cell is connected to each of the switches and means are provided for writing a signal into each of the memory cells. The signals stored in the memory cells are utilized to open or close the associated switch when enabled thereby connecting any one or more of said inputs to a selected plurality of outputs.

9 Claims, 7 Drawing Figures

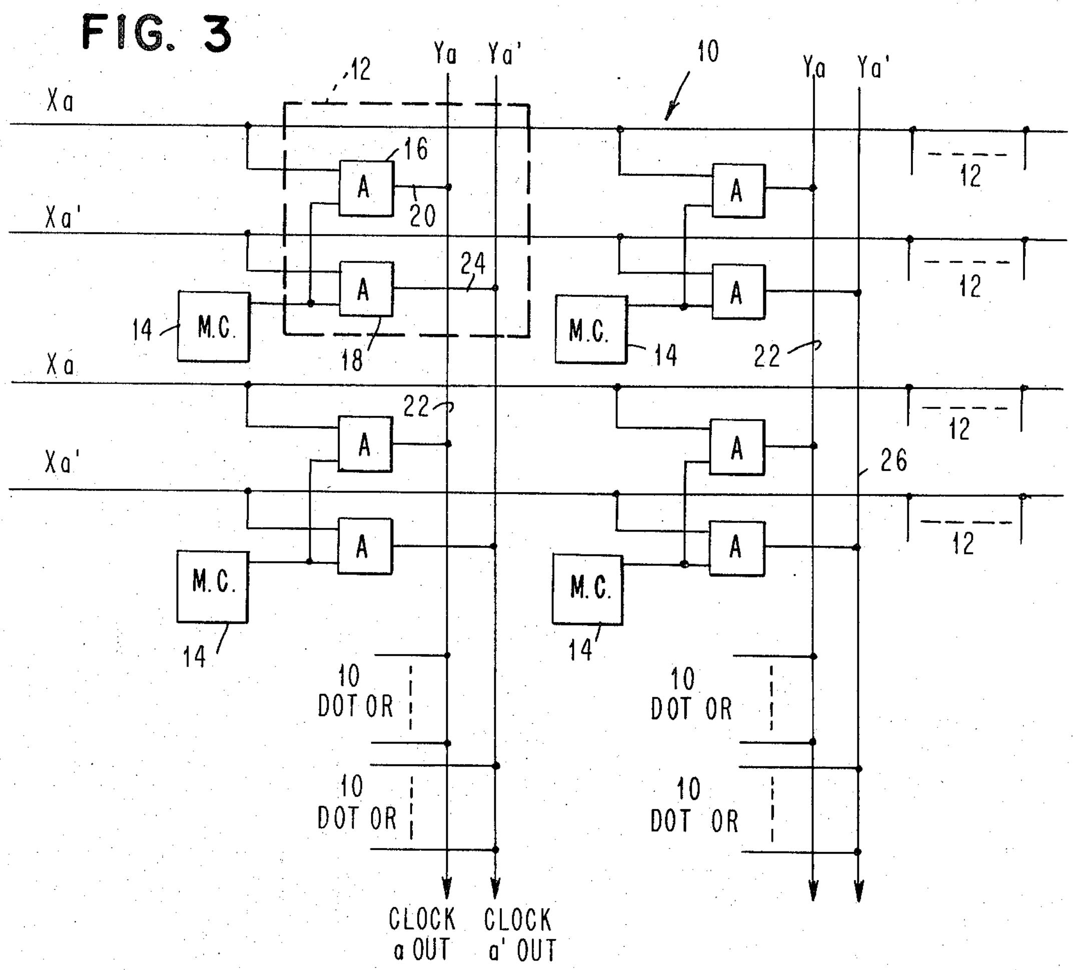
FIG. 6
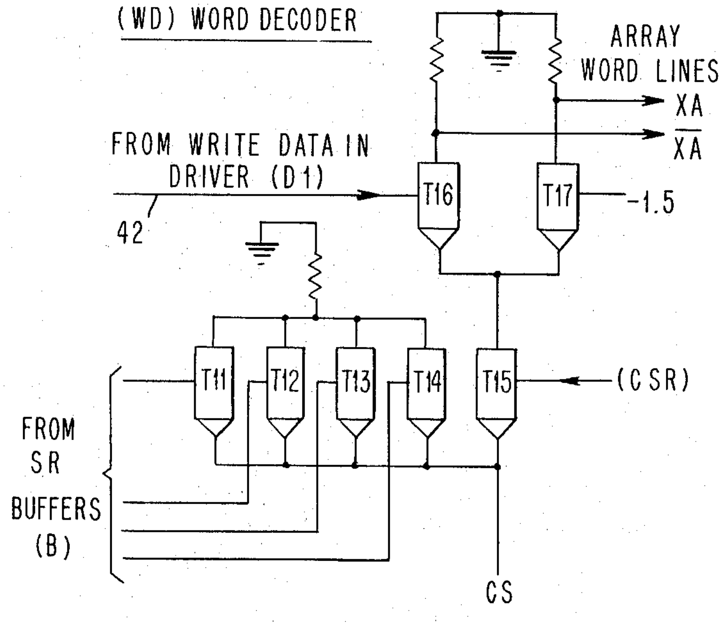
FIG. 7
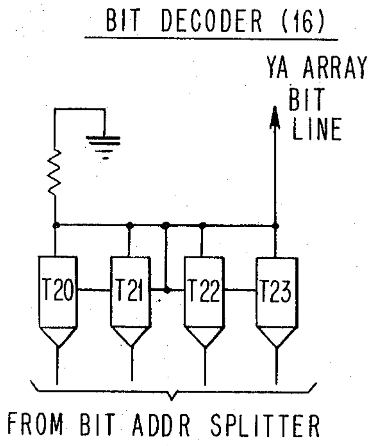

PROGRAMMABLE SIGNAL DISTRIBUTION SYSTEM

BACKGROUND OF THE INVENTION

Field of the Invention

The invention relates to a signal distribution system and more particularly, to a programmable signal distribution system for providing precisely timed signals in accordance with a predetermined program.

In large scale information handling systems, a major problem is the timing which is usually provided by precisely timed clock pulses. These precisely timed clock pulses must be transmitted from the clock pulse source to the utilization means via some kind of transmission medium such as cables. The cables or logic units through which the clock pulses pass introduce various delays. For example, a longer length of cable will introduce a greater delay than a shorter length. This delay introduced by the cable or the logic circuits is known as skew. To offset the skew problem the cabling in an information handling system has previously been tuned. That is, a delay of some kind has been introduced into the shorter cable lengths to delay the clock pulses until they are precisely timed with the pulses passing down the longest cable. This has required the tuning of a large number of cables which is a time consuming process. The introduction of passive tuning networks has been further complicated by the newer techniques in electronics which provide for large scale integration. The probe points for obtaining and measuring signals are now relatively inaccessible so that the various delays cannot be measured nor can delays to compensate for skew be easily introduced.

Accordingly, it is an object of the present invention to provide a clock distribution system which is programmable.

It is a further object of the present invention to provide a programmable clock distribution system which has the ability to provide clock pulses at predetermined times in accordance with a predetermined setting.

It is a further object of the present invention to provide a programmable clock distribution system which can provide the power up signals.

It is another object of the present invention to provide a programmable clock distribution system in which the signal inputs can be combined to provide a predetermined pulse length.

BRIEF SUMMARY OF THE INVENTION

Briefly, the invention comprises a programmable signal distribution system in which a plurality of input signals are connectable to a plurality of outputs in accordance with a predetermined distribution pattern. The system includes an array of switches connected between each of the inputs and each of the outputs wherein a memory cell is connected to each of the switches. Means are provided for writing a signal into each of the memory cells which is determinative of the condition of the respective switch and enabling means are provided for enabling the operation of each of the crosspoint switches to provide an output in accordance with the signal stored in the respective memory cell thereby connecting any one of the inputs to any one or more of the selected plurality of outputs.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 3 is a block diagram showing the array of FIG. 1 in more detail.

FIG. 6 is a circuit diagram showing the word decoder identified as $WD_0$–$WD_{11}$ in FIG. 5.

FIG. 7 is a circuit diagram showing the bit decoder identified as blocks $BD_0$–$BD_{13}$ of FIG. 5.

DETAILED DESCRIPTION OF THE PREFERRED EMBODIMENTS

Figure 1:
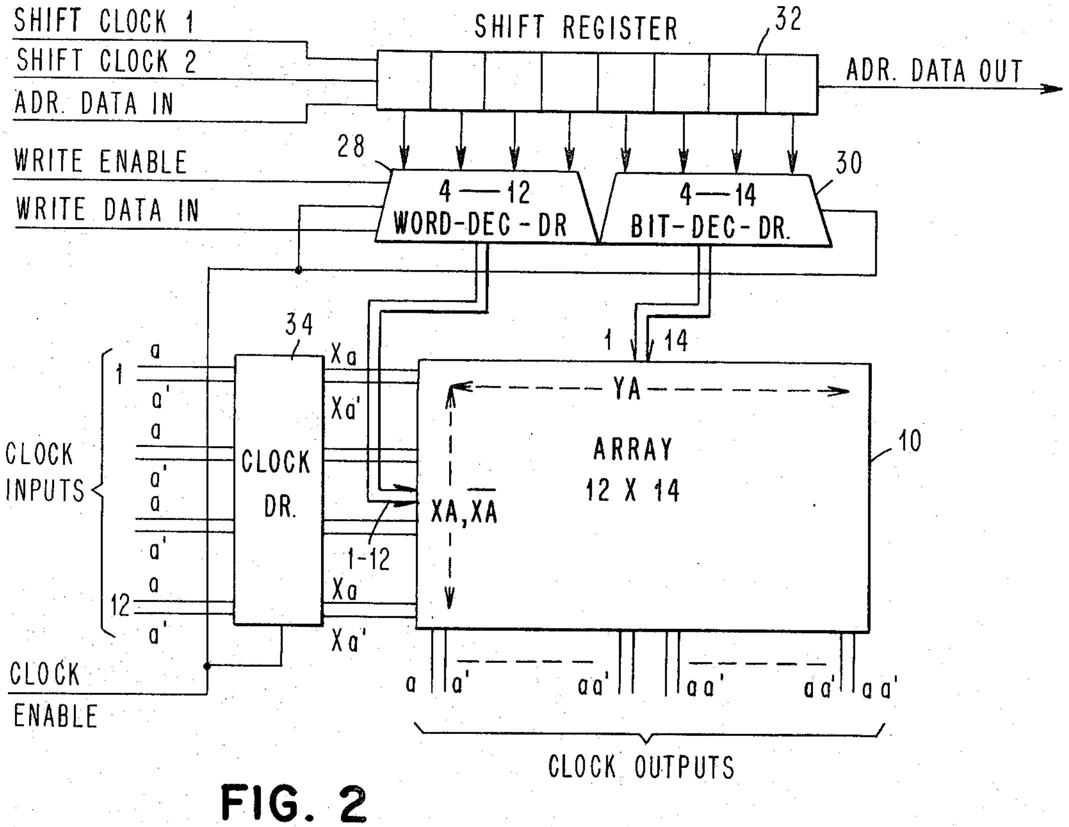
FIG. 1 is a block diagram showing the functions of the clock distribution system.
Figure 2:
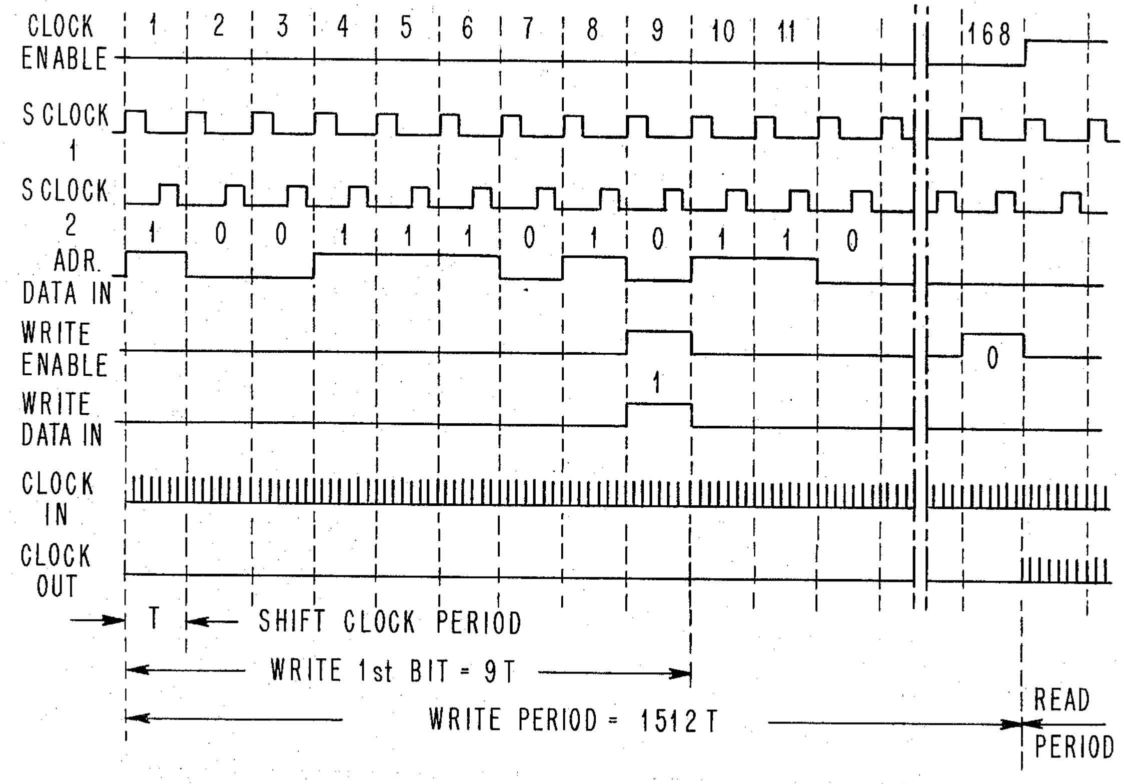
FIG. 2 is a timing diagram showing the timing pulses necessary for the operation of the clock distribution system of FIG. 1.

Referring to FIGS. 1 and 3, it can be seen that the heart of the system is a 12 × 14 array 10 of crosspoint switches 12. Each crosspoint switch 12 has a memory cell 14 associated therewith. The memory cell 14 is capable of controlling the crosspoint switch 12 according to the contents of the individual memory cells. The function of the array 10 can best be seen in FIG. 3 wherein the crosspoint switch 12 is shown functionally as two separate AND gates 16 and 18. Each of the AND gates 16 and 18 are controlled by the memory cell 14. The clock inputs Xa and Xa′ are applied to the individual AND gates 16 and 18 (FIG. 3) and pass therethrough depending upon the content of the memory cell 14. If the memory contains a 1, the top AND gate 16, in this case, will produce a 1 output since both inputs to the AND gate 16 are the same. That is, Xa = 1 and the 1 stored in the memory cell 14 are both applied to the top AND gate 16. The positive or up output 20 from the crosspoint switch is applied to the Ya column line 22. At the same time, the 1 signal in the memory cell 14 and a 0 input on the Xa′ line are applied to the other AND circuit 18 producing the 0 or complement output on line 24. The other clock pulse inputs Xa and Xa′ from the other crosspoint switch AND circuits on the same column are dot OR'ed onto the Ya line 22 and onto the Ya′ line 26, respectively. The clock outputs a and a′ are taken from the respective Ya and Ya′ lines 22 and 26. Since the array 10 is a 12 × 14 array it is required that twelve crosspoint switch outputs 20 and 24 be dot OR'ed to each of the Ya and Ya′ column lines 22 and 26, respectively. The array 10 has 14 columns 22, 26 each of which has 12 clock pair inputs applied thereto. The memory cells 14 in the array 10 can be written into via the word decoder driver 28, the bit decoder driver 30 and shift register 32 combination. The address data is shifted into the shift register 32 by the shift clocks 1 and 2. The address is read from the shift register 32 in parallel; the last 4 positions being read into the bit decoder driver 30 and the first 4 positions being read into the word decoder driver 28. The output of the word decoder driver 28 is twelve pairs of signals XA and $\overline{XA}$. These input signal pairs applied to the array 10 determine the row in the array in which the selected memory cell 14 is located. Similarly, the bit decoder driver 30 provides the bit outputs YA which essentially select the column in the array 10 corresponding to the address. Of course, the memory cell 14 and crosspoint switch 12 at the intersection of the selected row and column correspond to the memory address. The input clock pairs a and a' are applied to the clock driver 34 whose output applies the clock pulses in pairs Xa, Xa' to the crosspoint switches. The crosspoint switch having a memory cell 14 associated therewith which contains a 1 will be in the closed condition so that the positive clock pulse will pass therethrough and appear at the output as a positive clock signal a and the complement clock signal a'. It can be seen from the above, that the operation consists of addressing and writing one bit at a time. Therefore, 168 write operations are required to complete the entire distribution pattern. Once the address data has been shifted into the shift register 32, the write enable line comes up and the write data is written in through the word and bit decoders 28 and 30. The address data is 8 bits long and at the 8 bit time, the shift register 32 is full bringing up the write enable line. At this time, the array is addressed and is ready to store logic 1 or logic 0 depending upon whether a logic 1 or a logic 0 is applied to the write data in line. The time to write one bit into the array is 9T where T is the shift clock period (see FIG. 2). To complete the writing of the 168 bits into the array 10, 1,512T are required. Of course, a logic 1 stored in the memory cell 14 means that the associated crosspoint switch 12 is closed, which provides a path between a clock input and a clock output. On the other hand, a logic 0 means the crosspoint switch is open and the path is disconnected. After the distribution pattern is written, the clocks a, a' are distributed through the crosspoint switches 12 simply by bringing up the clock enable line while all the other control lines are kept low. During the write period (clock enable down), all the clock outputs remain at logic 0 state regardless of whether the clocks are at the clock input or not. In other words, the outputs are not affected by the write operation. During the read period with the clock enable up and the write enable down, the logic states of the clock output follow those of the clock input. The address data in the shift register 32 have no effect on the distribution pattern of the array and thus no effect on the clock outputs. When the system is used strictly for distribution, only one bit per column is stored as logic 1. The outer bits are all logic 0. When it is desired to provide various pulse widths, the array can store more than one bit of logic 1 in a column. Since each input is connected to a column by the "OR" function, various pulse widths can be produced by feeding various clocks into the clock inputs for the same column. The width of the output pulse will depend upon the widths and the separation of the input clocks.

Figure 4:
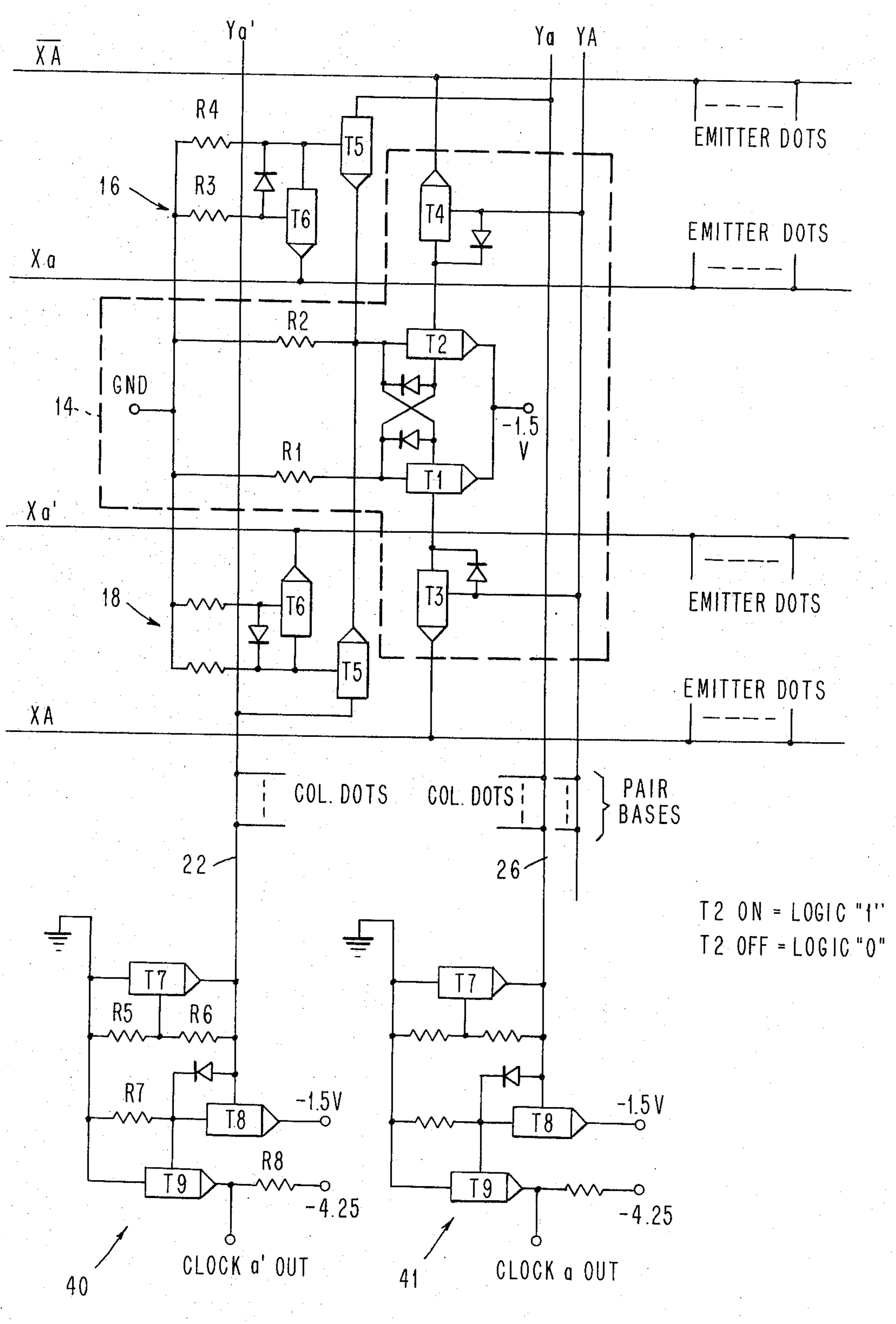
FIG. 4 is a schematic circuit diagram showing the circuitry of the memory cell and the AND gates with the output clock buffers.

The array circuit is shown schematically in FIG. 4. Transistors T1, T2, T3 and T4 with collector resistors R1 and R2 form a memory cell 14. The output of the cell 14 is connected to a pair of crosspoint switches 16, 18 acting as a pair of two input-positive AND gates as shown in FIG. 3. The crosspoint switch is divided into two parts, the input gates 16 and 18 and the output buffers 40 and 41. The input gates each consist of transistors T5 and T6 and resistors R3 and R4. The output buffers each consist of transistors T7, T8 and T9 and resistors R5, R6, R7 and R8. The combination of the memory cell 14 and the pair of input gates 16 and 18 is known as an array cell. The logic states of the memory cell 14 are defined as T2 On (T1 Off) = logic 1 and T2 off (T1 On) = logic 0. In order to write the data into the memory cell, the YA line is brought up and complementary inputs are applied to the XA and $\overline{XA}$ lines. A logic 1 is stored when XA is high and $\overline{XA}$ is low. When XA is low and $\overline{XA}$ is high, a logic 0 is stored.

When the memory cell stores logic 0, the pair of clock outputs, a and a', always stay low and are not affected by the inputs, Xa and Xa'. The clock outputs will follow the inputs when the memory cell stores logic 1. The specific memory cell circuit can be seen in FIG. 4. When the memory cell stores logic 0, T2 is Off (T1 is On) and its collector is high. This causes T5 to be Off regardless of whether T6 is On or Off. Since T5 is Off, the base of T8 is high and T8 itself is On, which consequently causes the emitter-follower T9 output, that is, the clock output a, to be low. The same thing happens to produce the other clock output a'.

When T2 is On and T1 is Off, the condition for a 1 storage in the circuit, the collector of T2 is low and consequently T5 is On or Off depending on the state of T6. When Xa is up, indicating a 1 input, T6 is Off. Therefore, the base input to T5 is high and T5 is consequently On. The collector of T5 in the On condition, is low and consequently the input on the base of T8 is low resulting in T8 being in the Off condition. Thus, the collector of T8 is high and consequently the base input to T9 is high causing T9 to be On. The clock output is taken from the emitter of T9 and is high when T9 is On. Thus, in the 1 storage condition of the memory, the output clock a or a' follows the input Xa and Xa', respectively. It should be appreciated that the same operation described above takes place with respect to the Xa' input.

Transistor T7 is used to clamp the T5 collector voltage for keeping T5 out of saturation. This significantly improves the delay variation affected by the transistor T5 collector dot. There are 11 other T5 collectors from 11 other array cells in the columns 22, 26 dott'ed together performing the OR function and connected to the respective output buffers 40 and 41.

Figure 5:
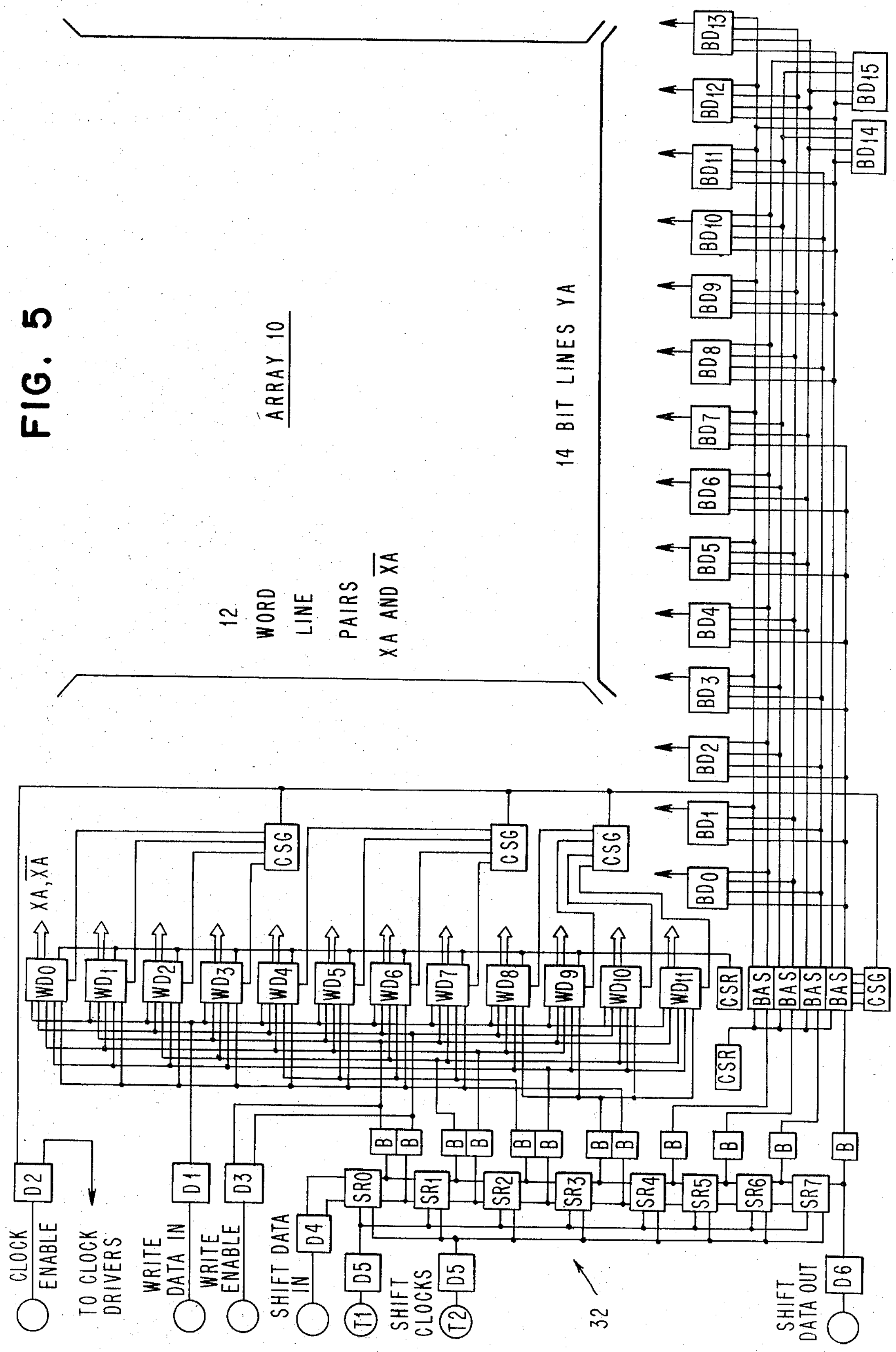
FIG. 5 is a block diagram of the addressing mechanism for the signal distribution system shown in FIG. 1.

The addressing mechanism for the memory cells 14 in the array is shown in block diagram form in FIG. 5. The various functions represented by the blocks of FIG. 5 are well known and can be mechanized by many known circuit types.

The word decoder circuit $WD_0$–$WD_{11}$ of the addressing mechanism is shown as a series gated current switch (FIG. 6). The write data in line 42 through the write data in driver D1 drives all 12 upper current switch inputs as can be seen from FIGS. 5 and 6. When all address inputs to a given select AND gate are down, the two milliamp current from the current source generator CSG will flow through the upper current switch pulling down either XA or $\overline{XA}$ as a function of the write data. The 11 other circuits will have at least one address input up, thus insuring that the currents will bypass their upper current switches forcing both XA and $\overline{XA}$ to an up level. The details of this circuit are shown in FIG. 6.

When the word decoder is selected (1 out of 12), the input to each of T11, T12 and T13 and T14 is down and these four transistors are Off. Consequently, T15, arranged in a current-switch form, will be On. T15 acts as a current source for the upper current switch T16 and T17. In this condition, an up level (logic 1) at the write-data-in line 42 will cause T16 to be On and T17 to be Off causing XA to be high and $\overline{XA}$ to be low. This results in a logic 1 being written into the memory cell as shown in FIG. 4. On the contrary, a low level input (logic 0) on the write-data-in line 42 will cause T16 to be Off and T17 to be On, thereby causing XA to be low and $\overline{XA}$ to be high which is the condition to write a logic 0 into the memory cell. When the decoder WD is not selected, that is, one of the four inputs T11, T12, T13 and T14 is high, T15 will be Off which in turn shuts off the current source of T16 and T17 and causes both XA and $\overline{XA}$ to be high. This will prevent the memory cell (shown in FIG. 4) from being affected by the bit line YA.

Referring to FIG. 5, it can be seen that the word decoder driver is broken down into 12 word decoders $WD_0$–$WD_{11}$. These word decoders put out a pair of signals XA, $\overline{XA}$ which are complementary and which are capable of energizing any of the 12 selected word line pairs of the programmable crosspoint switch array 12. The shift register 32 has eight stages SR0-SR7, the first four of which are utilized in addressing the 12 word lines. The four outputs from the first four states of the shift register are buffered and applied to the 12 word decoders $WD_0$–$WD_{11}$ in accordance with a 4 input code. It will be appreciated, that each of the combinations of states of the four shift register stages SR0-SR3 results in the energization of one of the word drivers $WD_0$–$WD_{11}$ thus providing the decoding of the data shifted into the shift register. The particular word driver energized produces a pair of outputs thereby selecting one of the twelve word lines or rows in the array. The necessary currents for operation of the word drivers $WD_0$–$WD_{11}$ are obtained from the current switch generators CSG. The write-data-in signal is applied to each of the word drivers $WD_0$–$WD_{11}$ through driver D1. The data will pass through only the word driver which has been addressed by the shift register combination corresponding to the combination of the particular word driver. During shift register loading or when changing the state of the write data, the write enable driver D3 energizes both outputs of the shift register bit 0 buffers. Because every circuit is driven by some phase of the bit 0 the result is that no word line is selected during invalid write time. Only the buffer B outputs are held up and therefore, the shift register 32 outputs themselves are free to change to properly load the shift register. The clock enable signal and its driver D2 turn off all the current source generators CSG during the read period to conserve chip power dissipation and supply currents.

The bit decoder driver 30 shown in FIG. 1 is broken down into 14 bit decoders $BD_0$–$BD_{13}$. These are connected to the last four stages SR4-SR7 of the 8 stage shift register 32 through the buffers B and bit adder splitters BAS to provide the decoding of the four possible combinations. It can be seen that the output YA of the respective bit decoders is capable of selecting one of the 14 bit lines in the array 10. The coincidence of the positive bit line YA which drives the bases of the write devices in the array 10 and the negative word line coming out of the word decoders $WD_0$–$WD_{11}$ turns on the desired write device in the desired location of the array 10.

The bit decoder as shown in FIG. 7 is essentially a four input diode AND gate. When all the inputs from the bit adder splitters (BAS) are up, all four transistors T20, T21, T22 and T23, which are acting as diodes, are not conducting. Consequently, the output YA will be up. The corresponding column of the crosspoint switch array shown in FIG. 4 will be selected (one out of 14). When any one of the four inputs is down, the corresponding transistor will be conducting and the output YA will be low. The corresponding column of the crosspoint switch array will not be selected.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A programmable signal distribution system comprising:
- a plurality of inputs and a plurality of outputs;
- an array of crosspoint switches connected between said inputs and said outputs;
- a memory cell connected to each of said crosspoint switches;
- means for writing a signal into each of said memory cells determinative of the condition of the respective crosspoint switch; and
- means for enabling the operation of each of said crosspoint switches to provide an output in accordance with said signal stored in said respective memory cell thereby connecting said respective inputs to said respective outputs.

2. A programmable signal distribution system in accordance with claim 1 wherein said plurality of inputs and outputs are paired and have input signals applied thereto in pairs, one signal applied to one input of each pair of inputs being the complement of the other signal of the pair of inputs.

3. A programmable signal distribution system in accordance with claim 2, wherein said array of crosspoint switches comprise pairs of AND circuits, each AND circuit of each pair receiving one of said input signals of a respective pair of input signals and said signal from the respective memory cell.

4. A programmable signal distribution system in accordance with claim 2, wherein each output of each pair of outputs is dot OR'ed with the corresponding output of the other pairs of outputs to produce the desired complementary output signal of said pairs of outputs.

5. A programmable signal distribution system, according to claim 1, wherein said memory cell is a (two stage) flip-flop circuit the one condition of which represents the storage of a 1 and the other condition of which represents the storage of a 0, each stage of the flip-flop having an output carrying the complimentary output signal to the signal on the output of the other stage.

6. A programmable signal distribution system according to claim 1, wherein said means for writing into each of said memory cells includes a shift register for receiving address data and decoding driver means for decoding the address in the shift register so that a write signal input is stored in the addressed memory cell.

7. A programmable signal distribution system according to claim 6, wherein said signal written into the addressed memory cell renders the respective crosspoint switch conductive or non-conductive so that signals applied thereto from said input are passed or not passed according to the value of said signal written into memory.

8. A programmable signal distribution system according to claim 1, wherein input signals applied to said input are clock pulses at different times, the clock pulses time being connected by the closed crosspoint switches to the respective outputs.

9. A programmable signal distribution system according to claim 6, wherein said means for decoding the address from said shift register includes a word decoder for selecting the row of the addressed memory cell and a bit decoder for selecting the column of the addressed memory cell, the crossing point of said row and column having the addressed memory cell associated therewith.

* * * * *